US012409390B2

(12) United States Patent
Zhao et al.

(10) Patent No.: US 12,409,390 B2
(45) Date of Patent: Sep. 9, 2025

(54) ONLINE SOMATOSENSORY DANCE COMPETITION METHOD AND APPARATUS, COMPUTER DEVICE, AND STORAGE MEDIUM

(71) Applicant: SHANGHAI BILIBILI TECHNOLOGY CO., LTD., Shanghai (CN)

(72) Inventors: Shichen Zhao, Shanghai (CN); Weijia Li, Shanghai (CN); Chaoran Li, Shanghai (CN); Peng Wang, Shanghai (CN); Zhihui Chen, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 375 days.

(21) Appl. No.: 18/018,877

(22) PCT Filed: Jun. 22, 2021

(86) PCT No.: PCT/CN2021/101383
§ 371 (c)(1),
(2) Date: Jan. 31, 2023

(87) PCT Pub. No.: WO2022/028135
PCT Pub. Date: Feb. 10, 2022

(65) Prior Publication Data
US 2023/0302368 A1 Sep. 28, 2023

(30) Foreign Application Priority Data
Aug. 6, 2020 (CN) .......................... 202010784706.7

(51) Int. Cl.
| A63F 13/80 | (2014.01) |
| A63F 13/428 | (2014.01) |
| A63F 13/795 | (2014.01) |
| A63F 13/798 | (2014.01) |

(52) U.S. Cl.
CPC ............ *A63F 13/80* (2014.09); *A63F 13/428* (2014.09); *A63F 13/795* (2014.09); *A63F 13/798* (2014.09); *A63F 2300/8047* (2013.01)

(58) Field of Classification Search
CPC ...... A63F 13/80; A63F 13/428; A63F 13/795; A63F 13/798; A63F 2300/8047
See application file for complete search history.

(56) References Cited

U.S. PATENT DOCUMENTS

| 11,783,723 B1 * | 10/2023 | Li | ........................ G06Q 50/01 |
| | | | 434/250 |
| 2002/0019258 A1 * | 2/2002 | Kim | ........................ A63F 13/45 |
| | | | 463/36 |

(Continued)

FOREIGN PATENT DOCUMENTS

| CN | 104436642 A | 3/2015 |
| CN | 108371814 A | 8/2018 |

(Continued)

OTHER PUBLICATIONS

International Patent Application No. PCT/CN2021/101383; Int'l Search Report; dated Sep. 15, 2021; 2 pages.

(Continued)

*Primary Examiner* — David L Lewis
*Assistant Examiner* — Shauna-Kay Hall
(74) *Attorney, Agent, or Firm* — BakerHostetler (57) ABSTRACT

This disclosure provides techniques of implementing online somatosensory dance competitions. The techniques comprise assigning a room to one or more players in response to receiving one or more requests of starting a game, wherein all players in a same room share a same dance video; outputting a plurality of standard movement images corresponding to the same dance video in a chronological order, wherein the plurality of standard movement images each indicate position coordinates of different skeleton nodes at a (Continued)

corresponding moment; receiving dance movement signals associated with each of the one or more players, and determining scores for each player based on a similarity between the dance movement signals and standard movement parameters, wherein the standard movement parameters correspond to the standard movement images; and collecting and outputting statistics on an overall score and ranking of each of the one or more players.

20 Claims, 7 Drawing Sheets

(56) References Cited

U.S. PATENT DOCUMENTS

| | | | |
|---|---|---|---|
| 2012/0214594 A1* | 8/2012 | Kirovski | A63F 13/814 463/36 |
| 2013/0095926 A1 | 4/2013 | Trewartha et al. | |
| 2018/0104597 A1* | 4/2018 | Dawson | A63F 13/212 |

FOREIGN PATENT DOCUMENTS

| | | |
|---|---|---|
| CN | 108615055 A | 10/2018 |
| CN | 108777081 A | 11/2018 |
| CN | 110711374 A | 1/2020 |
| WO | WO 2020/022550 A1 | 1/2020 |

OTHER PUBLICATIONS

China Patent Application No. 202010784706.7; Office Action; dated Mar. 26, 2025; 12 pages.

* cited by examiner

ONLINE SOMATOSENSORY DANCE COMPETITION METHOD AND APPARATUS, COMPUTER DEVICE, AND STORAGE MEDIUM

CROSS-REFERENCE TO RELATED APPLICATIONS

The present application is the U.S. National Stage of International Application No. PCT/CN2021/101383, filed on Jun. 22, 2021, which claims priority to Chinese Patent Application No. 202010784706.7, filed on Aug. 6, 2020, and entitled "ONLINE SOMATOSENSORY DANCE COMPETITION METHOD AND APPARATUS, COMPUTER DEVICE, AND STORAGE MEDIUM", both of which are incorporated herein by reference in their entireties.

TECHNICAL FIELD

The present application relates to the technical field of somatosensory games, and in particular to an online somatosensory dance competition method and apparatus, a computer device, and a storage medium.

BACKGROUND ART

Somatosensory dancing games, a new type of video game operated by changing body dance movements, have received widespread attention from more and more game enthusiasts in recent years. The inventors recognized that the somatosensory dancing games mainly have the following disadvantages: (1) Most of these games are played on large-size devices such as an Android television or a PS4 home game console. Such devices are not portable, and players can only play games in regular places. (2) Songs for dancing games can be produced and updated only by the official side. The songs are updated slowly and cannot keep up with the latest trends. Moreover, regular players can only play the officially released game songs, and can hardly participate in the production of the game songs. (3) Common somatosensory dancing games are mostly in a single-player level mode. Even if a multi-player matching mechanism is used, multiple players simply start with a game song at the same time, and then scores are separately provided according to how well the players complete movements in the song. The lack of interaction between the players makes it difficult to create a sense of urgency for a multi-player competition.

SUMMARY OF THE INVENTION

An objective of the present application is to provide a somatosensory dancing game solution that is not restricted by gaming devices, provides good interaction between multiple players, and supports flexible selection of dance videos, so as to solve the above problems.

To achieve the foregoing objective, the present application provides an online somatosensory dance competition method, including:

assigning a room to one or more players in response to a start game request sent by the player, where all players in the same room share the same dance video;

outputting a plurality of standard movement images corresponding to the dance video in chronological order, where the standard movement image is used to represent position coordinates of different skeleton nodes at a corresponding moment;

receiving a dance movement signal sent by each of the players, and giving the player a score based on a similarity between the dance movement signal and a standard movement parameter, where the standard movement parameter corresponds to the standard movement image; and collecting and outputting statistics on an overall score and ranking of each of the players.

According to the online somatosensory dance competition method proposed in the present application, the step of assigning a room to one or more players in response to a start game request sent by the player comprises:

obtaining characteristic data corresponding to the player; and assigning players having the same or similar characteristic data to the same room.

According to the online somatosensory dance competition method proposed in the present application, the plurality of standard movement images are generated through the following steps:

performing a conversion condition check on the dance video uploaded by a user, to determine whether the dance video meets a preset condition;

extracting, for the dance video that succeeds in the conversion condition check, a skeleton node image corresponding to each video frame based on a skeleton node model; and performing cluster analysis on all skeleton node images, and using a skeleton node image corresponding to a cluster center of each obtained cluster set as the standard movement image.

According to the online somatosensory dance competition method proposed in the present application, the step of determining whether the dance video meets a preset condition comprises:

checking whether a number of characters in the dance video is within a preset number range;

checking whether a character object in the dance video is fixed; and checking whether a proportion of a character in the dance video is within a preset proportion range.

According to the online somatosensory dance competition method proposed in the present application, the standard movement parameter is obtained through the following steps:

obtaining a first standard movement image and a second standard movement image with a preset frame number difference;

determining first position coordinates of a preset skeleton node in the first standard movement image and second position coordinates of the preset skeleton node in the first standard movement image; and calculating standard acceleration information, standard speed information, and standard direction information of the preset skeleton node in the second standard movement image based on the first position coordinates, the second position coordinates, and the preset frame number difference.

According to the online somatosensory dance competition method proposed in the present application, the step of outputting a plurality of standard movement images corresponding to the dance video in chronological order comprises:

obtaining a preset moving speed and a playback moment of the standard movement image, and a time difference between the standard movement image and a previous frame of standard movement image;

determining, based on the time difference and the preset moving speed, a position in which the standard movement image appears in a waiting area, so that the standard movement image enters an evaluation area at the playback moment based on the preset moving speed; and displaying the standard movement image in the evaluation area.

According to the online somatosensory dance competition method proposed in the present application, the step of receiving a dance movement signal sent by each of the players, and giving the player a score based on a similarity between the dance movement signal and a standard movement parameter comprises:

receiving, at a corresponding moment of a current video frame, the dance movement signal sent by the player, where the dance movement signal comprises acceleration information, speed information, and direction information; and comparing the movement signal with the pre-calculated standard movement parameter, and outputting scores to all the players in the same room at a corresponding moment of a next video frame based on a comparison result.

According to the online somatosensory dance competition method proposed in the present application, the method further comprises:

receiving, at the corresponding moment of the current video frame, a skill movement signal and/or a prop movement signal sent by the player; and outputting, based on the skill movement signal and/or the prop movement signal, an execution result of a corresponding skill or movement to all the players in the same room at the corresponding moment of the next video frame.

According to the online somatosensory dance competition method proposed in the present application, the method further comprises:

projecting all output content onto a target device in response to a screen projecting request sent by the player.

To achieve the foregoing objective, the present application further provides an online somatosensory dance competition apparatus, including:

a room assignment module adapted to assign a room to one or more players in response to a start game request sent by the player, where all players in the same room share the same dance video;

a standard movement output module adapted to output a plurality of standard movement images corresponding to the dance video in chronological order, where the standard movement image is used to represent position coordinates of different skeleton nodes at a corresponding moment;

a dance movement scoring module adapted to receive a dance movement signal sent by each of the players, and give the player a score based on a similarity between the dance movement signal and a standard movement parameter, where the standard movement parameter corresponds to the standard movement image, and is used to represent acceleration information, speed information, and direction information of a preset skeleton node in the standard movement image; and a statistics collection module adapted to collect statistics on an overall score and ranking of each of the players.

To achieve the foregoing objective, the present application further provides an online somatosensory dance competition system, including:

a mobile client for sending a start game request of a player, and obtaining a movement signal generated when the player holds the mobile client; and an online somatosensory dance competition apparatus, connected to the mobile client, for receiving the start game request sent by the mobile client, and playing a dance competition game for the player using the online somatosensory dance competition method described above.

The online somatosensory dance competition system proposed in the present application further includes a screen projecting device, connected to the mobile client and the online somatosensory dance competition apparatus, for receiving and displaying a game screen of the mobile client.

To achieve the foregoing objective, the present application further provides a computer device, including a memory, a processor, and computer-readable instructions stored on the memory and executable on the processor, where when executing the computer-readable instructions, the processor implements the following steps:

assigning a room to one or more players in response to a start game request sent by the player, wherein all players in the same room share the same dance video;

outputting a plurality of standard movement images corresponding to the dance video in chronological order, wherein the standard movement image is used to represent position coordinates of different skeleton nodes at a corresponding moment;

receiving a dance movement signal sent by each of the players, and giving the player a score based on a similarity between the dance movement signal and a standard movement parameter, wherein the standard movement parameter corresponds to the standard movement image; and collecting and outputting statistics on an overall score and ranking of each of the players.

To achieve the foregoing objective, the present application further provides a computer-readable storage medium having stored thereon computer-readable instructions, where when the computer-readable instructions are executed by a processor, the following steps are implemented:

assigning a room to one or more players in response to a start game request sent by the player, wherein all players in the same room share the same dance video;

outputting a plurality of standard movement images corresponding to the dance video in chronological order, wherein the standard movement image is used to represent position coordinates of different skeleton nodes at a corresponding moment;

receiving a dance movement signal sent by each of the players, and giving the player a score based on a similarity between the dance movement signal and a standard movement parameter, wherein the standard movement parameter corresponds to the standard movement image; and collecting and outputting statistics on an overall score and ranking of each of the players.

The online somatosensory dance competition method and apparatus, the computer device, and the readable storage medium provided in the present application can enable multiple players to play a dance competition game online at the same time. The present application allows a user to select any song and record and upload a dance video, and a standard movement image is generated based on the dance video uploaded by the user, so that the player makes a corresponding dance movement based on the standard movement image. The present application supports a mobile client, and a game image can be projected onto a television, a projector, and other devices using a mobile phone screen projecting technology, which makes the usage flexible and not limited by time and space. The present application allows online interaction between the multiple players. In addition to displaying a score of the dance movement of each player in real time, the present application can also support personalized interaction between the players by means of props, skills, etc., thereby creating a good competitive game experience.

DETAILED DESCRIPTION OF EMBODIMENTS

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

The present application provides an online somatosensory dance competition game, which can enable multiple players to play a dance competition online at the same time. The present application allows a user to select any song and record and upload a dance video, and a standard movement image is generated based on the dance video uploaded by the user, so that the player makes a corresponding dance movement based on the standard movement image. The present application supports a mobile client, and a game image can be projected onto a television, a projector, and other devices using a mobile phone screen projecting technology, which makes the usage flexible and not limited by time and space. The present application allows online interaction between the multiple players. In addition to displaying a score of the dance movement of each player in real time, the present application can also support personalized interaction between the players by means of props, skills, etc., thereby creating a good competitive game experience.

Embodiment 1

Figure 1:
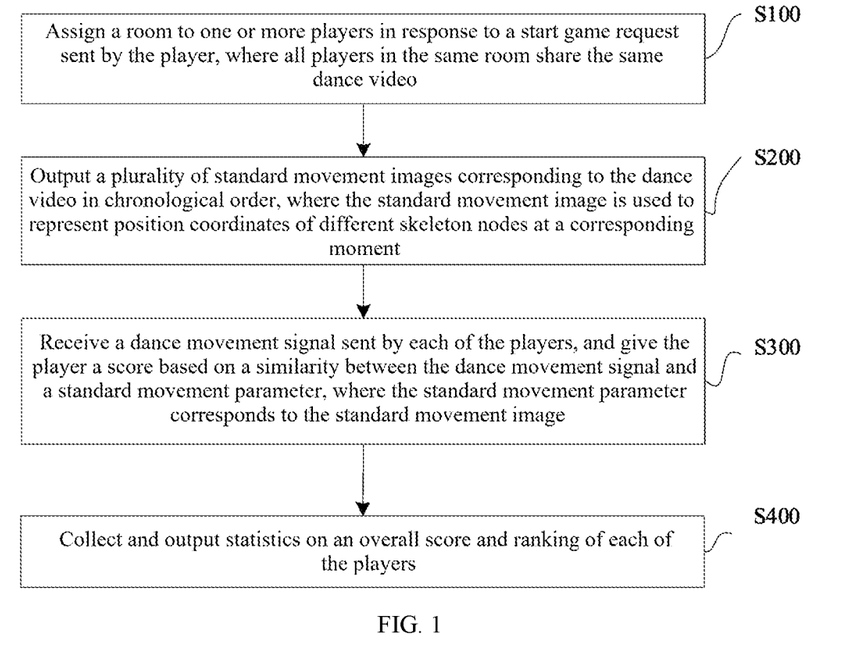
FIG. 1 is a flowchart of Embodiment 1 of an online somatosensory dance competition method according to the present application.

Referring to FIG. 1, this embodiment proposes an online somatosensory dance competition method. The method includes the following steps.

S100: Assign a room to one or more players in response to a start game request sent by the player, where all players in the same room share the same dance video.

The start game request in this embodiment may be initiated by the player on a mobile client based on a specific dance video. The dance video may be provided by a game developer, or may be recorded and uploaded by a user. Initiating a game request based on the specific dance video refers to using a song in the dance video as a background song and using a dance movement in the dance video as an evaluation criterion to evaluate a dance movement made by the player.

In an example, after tapping a start game button, the player enters a display device selection interface for the player to select a corresponding large-screen device, such as a television or a projector. It may be understood that a display area of a mobile phone screen is relatively small, and the user experience can be improved by projecting the mobile phone screen onto a large-size display device under suitable conditions. Certainly, it is not mandatory to select a display device in this example. If the player does not have an available display device or does not want to project the screen, this step can be skipped. When a large-screen device is to be selected, in this embodiment, the Miracast screen projecting protocol can be used to project the mobile phone screen. After a screen projecting connection is successful, the screen of the mobile phone is displayed on the large-screen device synchronously, which makes it easy for the player to play a somatosensory game.

After receiving the game request of the player, a server first obtains characteristics of the player. The characteristics of the player may include, for example, whether the player has played the current song, the player's overall score on other songs, or the number of persons in the room set by the player. The server assigns a room based on the above characteristics. For example, players having similar overall scores are matched to play the game in the same room, or players who set the same number of persons in a room are matched to play the game in the same room. In this embodiment, the number of players in the same room is set to a default value, such as 10, during initialization, or the player may set minimum and maximum values thereof. The game server finds, based on the set number of players, a sufficient number of players to play the game together in the same room.

S200: Output a plurality of standard movement images corresponding to the dance video in chronological order, where the standard movement image is used to represent position coordinates of different skeleton nodes at a corresponding moment.

As mentioned above, in this embodiment, the dance movement in the dance video is used as the evaluation criterion to evaluate the dance movement made by the player. To quantify the dance movement in the dance video, in this embodiment, a plurality of standard movement images are extracted from the dance video. Each standard movement image may be obtained by removing the background of the dance video, and retaining only position coordinates of different skeleton nodes in the human body, to correspond to a dance movement.

An existing image recognition technology can be used to recognize each video frame in the dance video, and a corresponding standard movement image is generated based on each video frame. For example, a specific character in a video frame is first recognized, and then skeleton node coordinates of the specific character are recognized. A specific method for generating the standard movement image is described in detail below in this embodiment.

S300: Receive a dance movement signal sent by each of the players, and give the player a score based on a similarity between the dance movement signal and a standard movement parameter, where the standard movement parameter corresponds to the standard movement image, and is used to represent acceleration information, speed information, and direction information of a preset skeleton node in the standard movement image.

The dance movement signal in this embodiment may be generated by a sensor in the player's mobile phone. It may be understood that existing mobile phones come with an acceleration sensor, a gyroscope sensor, a direction sensor, etc. Therefore, in this embodiment, the above-mentioned sensor in the mobile phone is used to monitor the dance movement of the player and give a corresponding score. The mobile phone can detect the dance movement signal, including but not limited to, acceleration information, speed information, and direction information when the player makes the dance movement. Therefore, in this embodiment, the standard movement parameter, including but not limited to, standard acceleration information, standard speed information, and standard direction information corresponding to each movement is first obtained and stored. The standard acceleration information, the standard speed information, and the standard direction information may be detected in real time when the user records the video. For example, the dancer in the dance video completes a whole set of dance movements holding the mobile phone with the right hand, and standard acceleration information, standard speed information, and standard direction information corresponding to the dancer's right hand skeleton node are monitored and recorded based on a preset frequency, and are used as the evaluation criterion for the later dance competition between the players. In addition, the standard acceleration information, the standard speed information, and the standard direction information may alternatively be calculated based on the standard movement image, and a specific calculation method is described in detail later.

After the standard movement parameter is determined, the dance movement signal of the player is compared with the standard movement parameter in this step, to give a corresponding score for each movement based on the similarity. The score may be expressed on a specific 100-point scale, for example, may be 90 points, 80 points, 95 points, etc.; or may be expressed by grades, for example, may be perfect, super, good, not bad, miss, etc. Different visual effects may also be displayed along with the score at the same time, which is not limited in this embodiment.

S400: Collect and output statistics on an overall score and ranking of each of the players.

At the end of a round of game, this embodiment displays the overall score of each player, that is, an overall movement score obtained based on statistics on a score of each movement, and displays the rankings of all the players in the room in the form of a chart. Depending on the rankings of the players, the top-ranked players may also be rewarded with points or experience points. In addition, an overall chart may also be set based on the specific dance video, and statistics on players who play the game in this video and have obtained the highest scores in the history may be collected and displayed. Such a mechanism can motivate players to strive for perfection, constantly challenge themselves, improve the completion of movements, and master the use of skills and props in the game, to obtain higher scores and rank higher in the overall chart.

Figure 2:
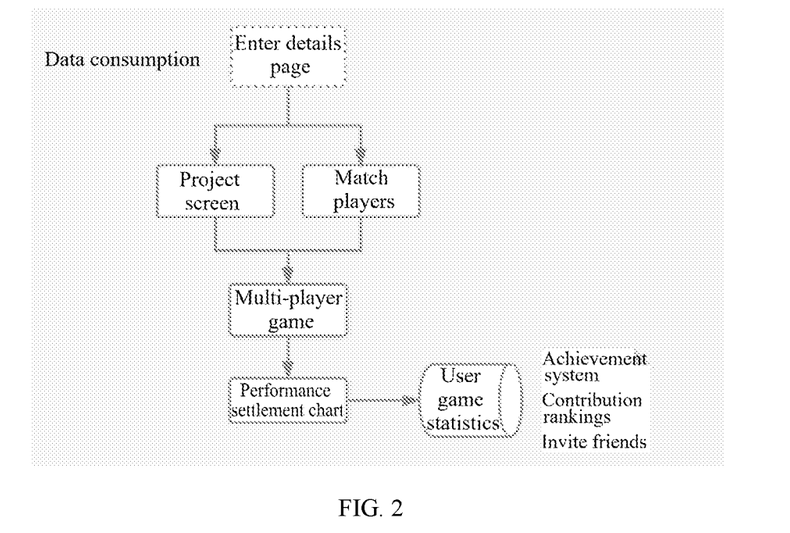
FIG. 2 is a schematic flowchart of collecting overall statistics of players according to Embodiment 1 of the present application.

FIG. 2 is a schematic flowchart of collecting overall statistics of players according to Embodiment 1 of the present application. As shown in FIG. 2, after entering a game details page, the player chooses to project the screen and match players, and then enters the multi-player somatosensory dance competition game. The user game statistics are collected based on a performance settlement chart of each player. The user game statistics may specifically include interfaces for achievement rankings, contribution rankings, and inviting friends.

Through the foregoing steps, this embodiment can allow multiple players to play an online dance competition game, providing a good interactive experience of the game. This embodiment is not limited to a specific device, and a dance competition game can be played at any time only with a mobile phone, which can effectively improve the player's participation.

Figure 3:
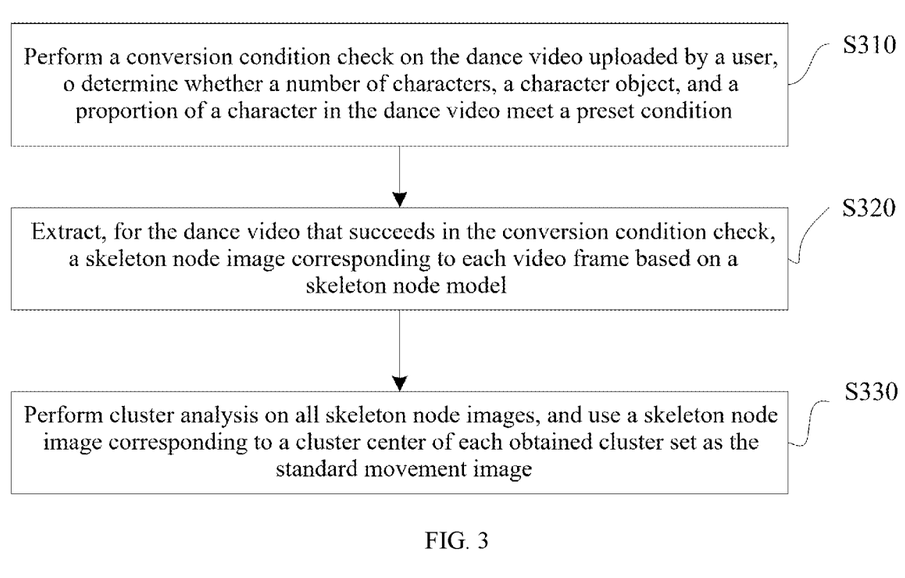
FIG. 3 is a schematic flowchart of generating a standard movement image in Embodiment 1 of an online somatosensory dance competition method of the present application.

FIG. 3 is a schematic flowchart of generating a standard movement image in Embodiment 1 of an online somatosensory dance competition method of the present application. As shown in FIG. 3, the step of generating a standard movement image includes the following steps.

S310: Perform a conversion condition check on the dance video uploaded by a user, to determine whether a number of characters, a character object, and a proportion of a character in the dance video meet a preset condition.

In this step, the conversion condition check is performed to determine whether a standard movement image can be generated based on a dance video uploaded by the user. If there are too many characters in the dance video, the character object is not fixed, the proportion of the character is too small, etc., the generated standard movement image may not be sharp or accurate enough, and therefore this situation needs to be excluded. Specifically, the content of the conversion condition check performed in this embodiment mainly includes the following aspects:

(1) Check Whether the Number of Characters in the Video Meets a Requirement

There should not be too many characters in the scene, because too many characters make the scene complex, and also easily interfere with the player when the players dances along. In an example, it is specified that the number of characters in the dance video should not be greater than 2. When there is one character in the video, the character naturally becomes a lead dancer. When there are two characters in the video, the user needs to designate one of them as a lead dancer. The standard movement image in this embodiment is generated based on a movement of the lead dancer.

(2) Check Whether the Character Object in the Video is Fixed

The fixed character object means that the character in the video appear in the scene throughout, and the number of characters neither increases nor decreases during the entire dance process. This can ensure that the lead dancer appears all the time, so that a plurality of complete and smooth standard movement images can be generated. In addition, a clipped or spliced video can be filtered out by checking the fixedness of the character object, to ensure the originality and integrity of the dance video.

(3) Check Whether an Average Proportion of the Character in the Shot on the Screen is Reasonable Ideally, the lead dancer is in the middle part of the entire screen and is close to the camera, so that the player can see the movements of the lead dancer more clearly in the game, and it also ensures the overall aesthetics of the scene. Generally, it is reasonable that the lead dancer's height occupies 50% to 90% of a frame of image. Certainly, due to camera shake or to highlight some visual effects, the proportion of the lead dancer's height in each frame of image may vary, which is acceptable as long as the variation does not exceed a specific range. Therefore, in this step, the dance video is checked by using the average proportion of the character in the image. For example, first, for each video frame, a first proportion of a distance between a head node and a foot node in skeleton nodes of the lead dancer in the entire frame width is calculated. Next, first proportions for all video frames are averaged to obtain the average proportion. If the average proportion is within a preset proportion range (such as 50% to 90%), the dance video succeeds in the check; otherwise it fails.

Figure 4:
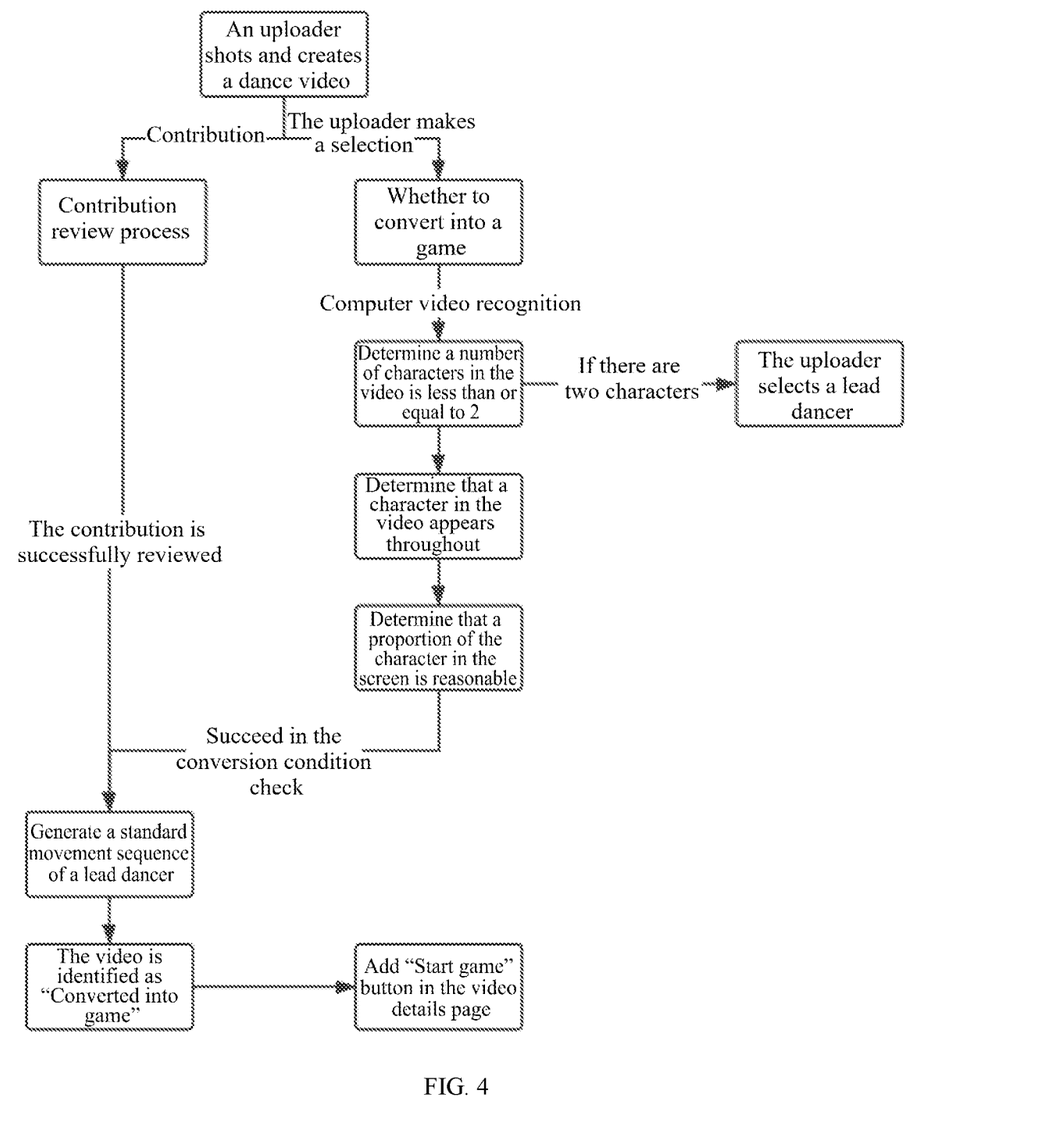
FIG. 4 is a schematic flowchart of converting a dance video into a dance competition game according to Embodiment 1 of the present application.

FIG. 4 is a schematic flowchart of converting a dance video into a dance competition game according to Embodiment 1 of the present application. As shown in FIG. 4, an uploader (a user who uploads videos) uploads and submits a dance video recorded, and then enters a contribution review process. The purpose of the contribution review process is to ensure that the video uploaded by the user meets the requirements of laws and regulations, e.g., whether the video conforms to socialist values, whether the video conforms to the relevant provisions of the copyright law, etc. During the contribution review process, the uploader may also choose whether to convert the video song into a game. If yes, then a computer recognition technology is used to sequentially identify whether the number of characters in the dance video meets the requirement, whether the character object is fixed, and whether the proportion of the character in the image is reasonable. When the above conditions are all met, a standard movement sequence of the lead dancer is generated, and the dance video is identified as "Converted into game". In this embodiment, the contribution review process and the game conversion process are processed concurrently, which can improve video processing efficiency and reduce the user's waiting time. After the conversion is successful, a "Start game" button is added to the details page of the dance video. When the player taps the "Start game" button, it is equivalent to initiating a start game request.

S320: Extract, for the dance video that succeeds in the conversion condition check, a skeleton node image corresponding to a target dancer in each video frame based on a skeleton node model.

After it is determined that the dance video succeeds in the conversion condition check, in this step, any existing skeleton node recognition algorithm may be used to recognize skeleton nodes corresponding to the target dancer in each video frame. For example, any one of a 15-skeleton node model, an 18-skeleton node model, or a 25-skeleton node model may be used to recognize skeleton nodes. There may be one or more target dancers in this embodiment. When there is one target dancer, a dancer at a specific position (for example, on the front side or the left side) may be used as the target dancer, or a dancer designated by the user may be used as the target dancer. When there are a plurality of target dancers, all the dancers in the dance video may be used as the target dancers, or several dancers among them at specific positions may be used as the target dancers, which is not limited in the present application. The numbers 15, 18, and 25 above each represent a number of skeleton nodes. A larger number of skeleton nodes indicates a higher recognition accuracy, and also more computing resources to be occupied. During specific implementation, different skeleton node models can be flexibly selected depending on a number of dance videos to be processed and a configuration of a server.

S330: Perform cluster analysis on all skeleton node images corresponding to each target dancer, and use a skeleton node image corresponding to a cluster center of each obtained cluster set as the standard movement image.

The cluster analysis in this step is intended to divide all the skeleton node images into a plurality of similar sets based on a position relationship of different skeleton nodes, so that a cluster center for each set can represent a standard movement image. The cluster analysis may be performed using any existing clustering algorithm, such as a k-means clustering algorithm, a mean shift clustering algorithm, a density-based clustering algorithm, a Gaussian mixture model clustering algorithm, or an agglomerative hierarchical clustering algorithm. This is not limited in this embodiment.

It may be understood that if the number of output standard movement images is too large, the movements appear very dense during the game, and it may be difficult for an average player to complete the corresponding dance movements in time. On the contrary, if the number of the standard movement images is too small, the player is often in an "idle" state, and it is difficult to widen the gap between the performances of different players in this embodiment. These are both detrimental to a good game experience. Based on experience, in this embodiment, preferably, one standard movement image is output every 1.5 seconds on average, which is a relatively reasonable extraction frequency. In other words, one video frame is extracted every 1.5 seconds, and a standard movement image is generated based on the extracted video frame. Certainly, the extraction frequency of 1.5 seconds is only used as an example, and should not be construed as a limitation on the present application. Usually, depending on rhythms of different songs, an extraction frequency ranging from 0.5 seconds to 3 seconds is allowed.

Figure 5:
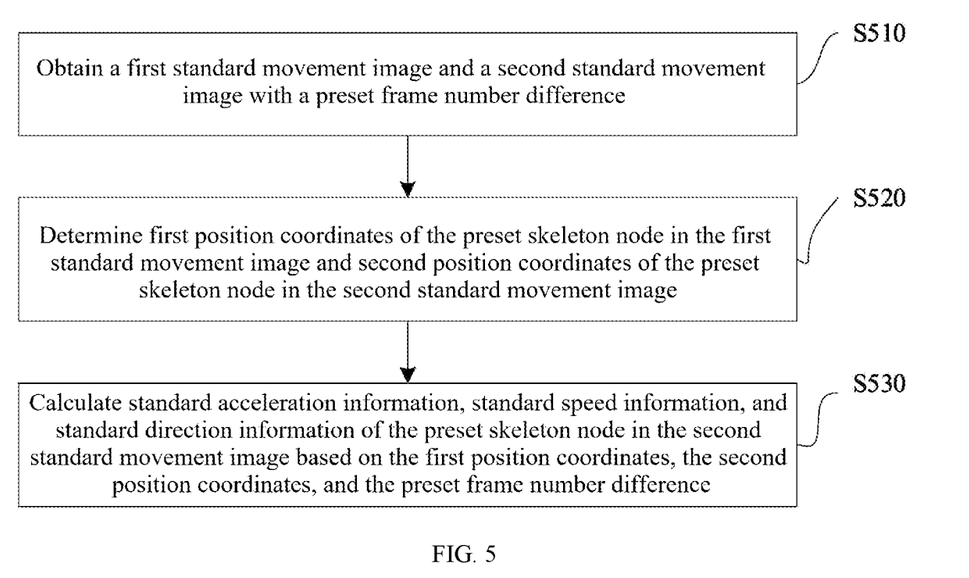
FIG. 5 is a schematic flowchart of calculating a standard movement parameter in Embodiment 1 of the present application.

As mentioned above, in this embodiment, the standard movement parameter may be calculated based on the standard movement image. FIG. 5 is a schematic flowchart of calculating a standard movement parameter in Embodiment 1 of the present application. As shown in FIG. 5, the step of calculating the standard movement parameter includes the following steps.

S510: Obtain a first standard movement image and a second standard movement image with a preset frame number difference.

It may be understood that each standard movement image is generated based on a corresponding video frame, and therefore a frame number difference between standard movement images is a frame number difference between the corresponding video frames. Therefore, when a frame rate is known, a time difference between any two standard movement images can be determined by multiplying the frame rate and the frame number difference.

S520: Determine first position coordinates of a preset skeleton node in the first standard movement image and second position coordinates of the preset skeleton node in the second standard movement image.

Assuming that a right wrist skeleton node is used as the preset skeleton node, position coordinates of the right wrist skeleton node of the lead dancer in the first standard movement image are the first position coordinates (x1, y1), and position coordinates of the right wrist skeleton node of the lead dancer in the second standard movement image are the second position coordinates (x2, y2).

S530: Calculate standard acceleration information, standard speed information, and standard direction information of the preset skeleton node in the second standard movement image based on the first position coordinates, the second position coordinates, and the preset frame number difference.

A distance d between the second position coordinates (x2, y2) and the first position coordinates (x1, y1) may be calculated according to the following formula:

$$d = \sqrt[2]{(y_2 - y_1)^2 + (x_2 - x_1)^2}$$

Then, based on the time difference t between the first standard movement image and the second standard movement image, a standard speed of the right wrist skeleton node at the corresponding moment of the second standard movement image can be calculated: v=d/t.

Similarly, a direction of a connecting line between the first position coordinates and the second position coordinates may further be used as a standard direction of the right wrist skeleton node at the corresponding moment of the second standard movement image. In addition, standard acceleration can further be calculated based on a speed variation calculated from two different standard movement images.

Through the foregoing steps, in this embodiment, relatively accurate quantifiable parameters can be obtained, so that a fairer and faster score can be given to the dance movement of the player.

Figure 6:
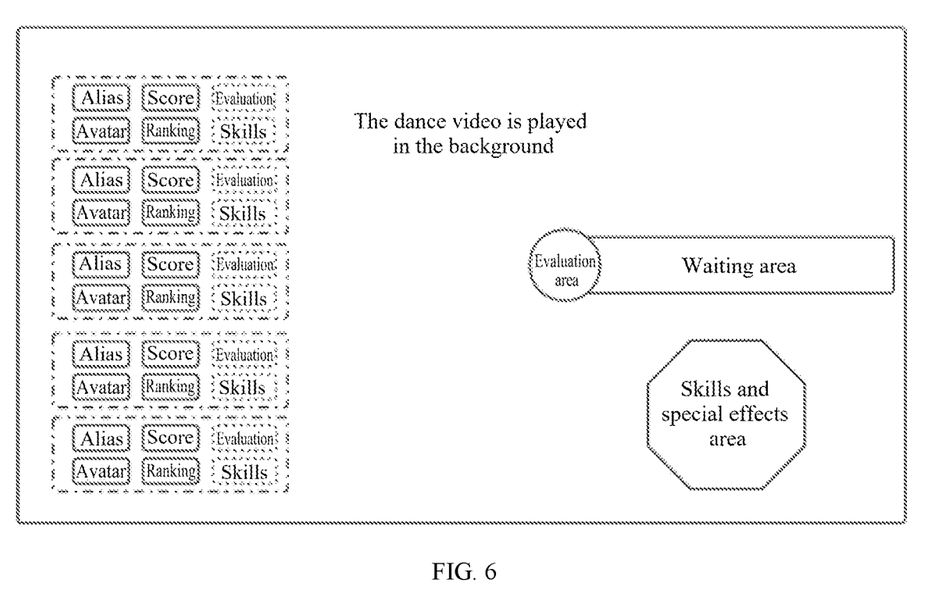
FIG. 6 is a structural block diagram of a game interface when a standard movement image is output in Embodiment 1 of the present application.
Figure 7:
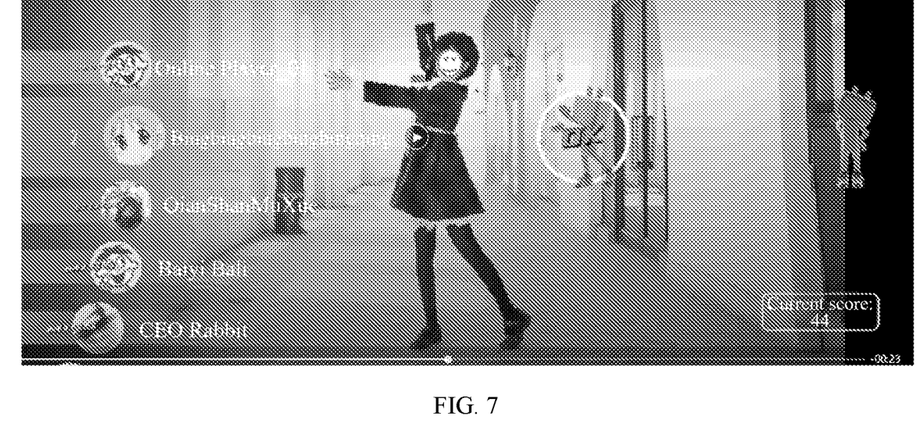
FIG. 7 is an effect display diagram of a game interface when a standard movement image is output in Embodiment 1 of the present application.
Figure 8:
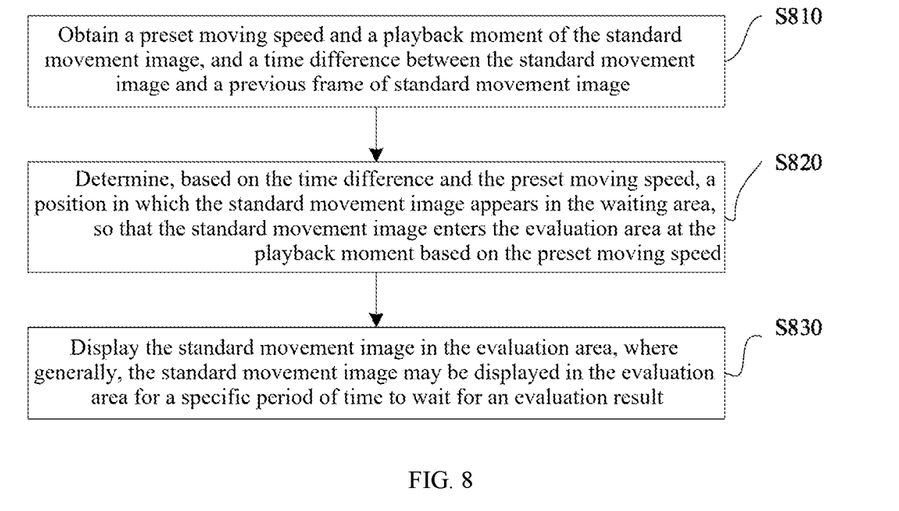
FIG. 8 is a schematic flowchart of outputting a standard movement image in Embodiment 1 of the present application.

In an example, the background of the game screen in this embodiment is the dance video played, and a plurality of standard movement images corresponding to the dance video are output based on the dance video in chronological order. FIG. 6 and FIG. 7 are respectively a structural block diagram and an effect display diagram of a game interface when a standard movement image is output in this embodiment. Referring to FIG. 6 and FIG. 7, it can be seen that aliases, avatars, and other information of the current players are displayed on the left side of the game interface, the background of the game interface is the dance video, and the middle of the right side of the game interface is a display region of the standard movement image. Specifically, the display region includes a rectangular bar-shaped waiting area and a circular evaluation area on the left side of the waiting area. The standard movement image slides from the rightmost of the waiting area to the left. When the standard movement image enters the evaluation area, the server gives a score based on the similarity between the dance movement signal of the dancer and the standard movement parameter corresponding to the standard movement image. Then, the player waits for a next standard movement image to enter the evaluation area, and the server continues to give the player a score. FIG. 8 is a schematic flowchart of outputting a standard movement image in Embodiment 1 of the present application. As shown in FIG. 8, outputting the standard movement image specifically includes the following steps.

S810: Obtain a preset moving speed and a playback moment of the standard movement image, and a time difference between the standard movement image and a previous frame of standard movement image.

The preset moving speed in this embodiment may be set based on a reaction time of the player, to prompt the player to prepare for the next standard movement. In addition, as mentioned above, each standard movement image is generated based on the corresponding video frame, and therefore the playback moment of the standard movement image is the playback moment of the corresponding video frame. The time difference between the current standard movement image and the previous frame of standard movement image may be calculated based on the frame number difference mentioned above.

S820: Determine, based on the time difference and the preset moving speed, a position in which the standard movement image appears in the waiting area, so that the standard movement image enters the evaluation area at the playback moment based on the preset moving speed.

As can be seen from FIG. 7, there are currently a standard movement image (presented as a small TV character) and a corresponding score (OK) in the evaluation area, and there is also a standard movement image (presented as a small TV character) displayed in the right part of the waiting area. The standard movement image on the right moves to the left at the preset speed, so that at the corresponding playback moment, the standard movement image on the right just enters the evaluation area, and the server gives a score based on the received dance movement signal of the player.

S830: Display the standard movement image in the evaluation area. Generally, the standard movement image may be displayed in the evaluation area for a specific period of time to wait for an evaluation result.

Through the foregoing steps, in this embodiment, the standard movement image for the next movement can be prompted to the player in a timely manner, and the standard movement image for the current movement can be displayed, thereby reducing the difficulty of the game and improving the user experience.

Figure 9:
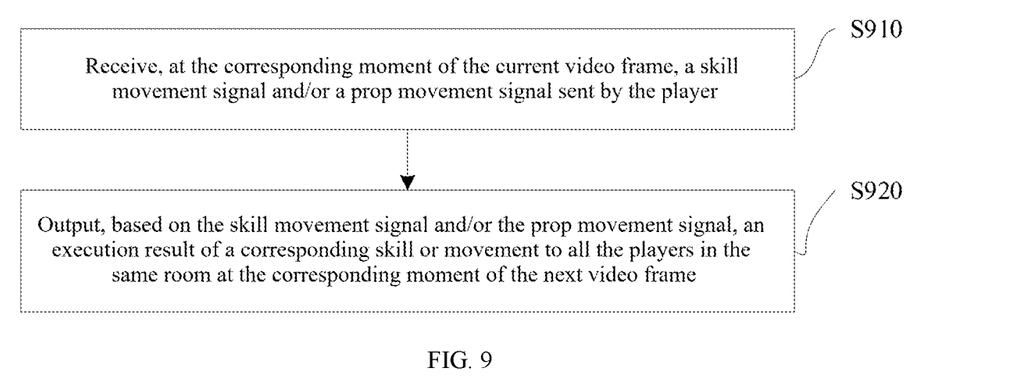
FIG. 9 is a schematic flowchart of using skills or props based on frame synchronization in Embodiment 1 of the present application.

In an example, the player may also be allowed to set movements with distinctive characteristics, such as jumping, raising a hand, etc., as triggering conditions for skills and props in the game. At the beginning of the game, the player can obtain game props and skills randomly assigned by the system. After the player uses a skill or prop, the player or the other players in the same room may be affected, such as: adding or subtracting points for the player, doubling the player's score for a period of time, deducting a prop from another player, etc. It should be noted that the server in this embodiment collects, on a per-frame basis (usually 50 ms, which can be adjusted), events triggered on all clients, such as skills, props, dance movements made by players, etc. At the end of each frame, the events on all the clients are encapsulated and packaged and forwarded to all the clients in the room. Specific steps are shown in FIG. 9.

S910: Receive, at the corresponding moment of the current video frame, a skill movement signal and/or a prop movement signal sent by the player. The skill movement signal means that the player triggers the corresponding skill by making a specific movement, which can be determined by monitoring a position change of a specific skeleton node. For example, the player presets waving an arm left and right in an interval between dance movements as an "attack" skill, and then when position coordinates of the player's wrist node or elbow node are detected to change repeatedly from side to side, it is determined that the player is using the "attack" skill. Similarly, the prop movement signal means that the player triggers the corresponding prop by making a specific movement, which can also be determined by monitoring a position change of a specific skeleton node. For example, the player presets swinging the head left and right in an interval between the dance movements as a "take pills" prop, and then when position coordinates of the player's head node are detected to change repeatedly from side to side, it is determined that the player is using the "take pills" prop. Generally, when the player uses the skill or prop, all other players in the same room are used as implementation objects. Certainly, the player may also designate one or several other players in the same room as implementation objects, which is not limited in this embodiment. The skill movement signal and/or the prop movement signal includes movement information and implementation object information.

S920: Output, based on the skill movement signal and/or the prop movement signal, an execution result of a corresponding skill or movement to all the players in the same room at the corresponding moment of the next video frame.

Figure 10:
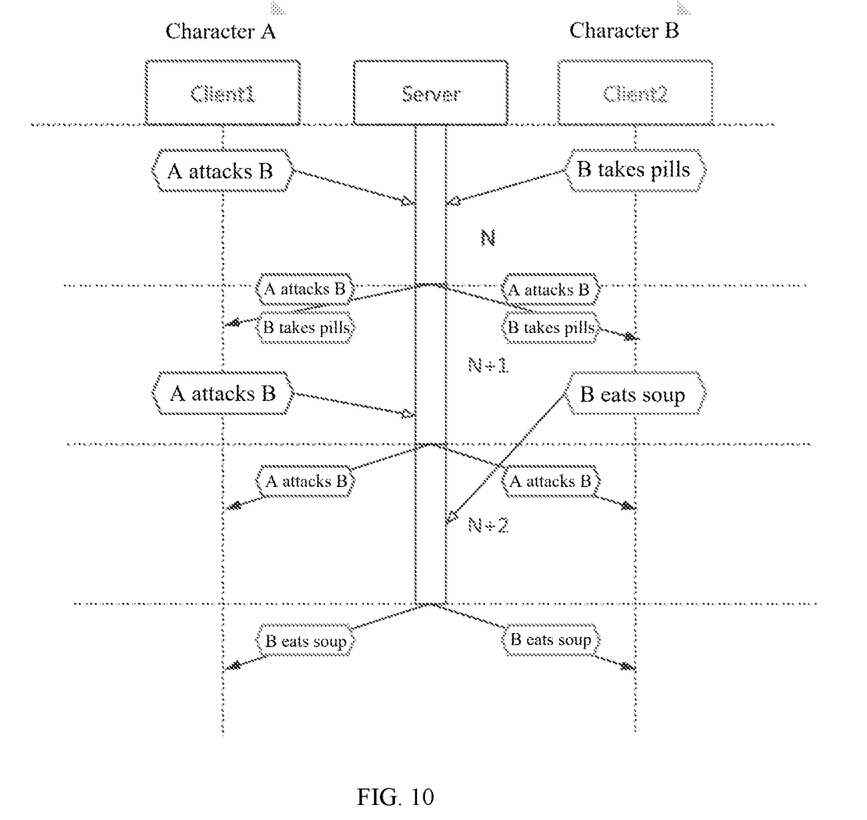
FIG. 10 is a schematic flowchart of using skills or props in Embodiment 1 of the present application.

FIG. 10 is a schematic flowchart of presenting skills or props based on frame synchronization in Embodiment 1 of the present application. As shown in FIG. 10, it is assumed that there are two players, a character A and a character B; in the same room, the character A uses the skill "A attacks B" to the character B at a corresponding moment of an $N^{th}$ frame; and at the same time, the character B uses the prop "B takes pills". Then the skill "A attacks B" and the prop "B takes pills" are sent to clients of the character A and the character B at a corresponding moment of an $(N+1)^{th}$ frame. For another example, at a corresponding moment of the $(N+1)^{th}$ frame, the character A uses the skill "A attacks B" to the character B and sends it to the server at the same time, and the character B uses the prop "B takes pills" at the corresponding moment of the $(N+1)^{th}$ frame. Due to a network delay, the prop "B takes pills" used by the character B arrives at the server at a corresponding moment of an $(N+2)^{th}$ frame. In this case, the server sends the skill "A attacks B" to both the character A and the character B at the corresponding moment of the $(N+2)^{th}$ frame, and sends the prop "B takes pills" to both the character A and the character B at the corresponding moment of an $(N+3)^{th}$ frame.

Through the foregoing frame synchronization process, in this embodiment, the skill movement or the prop movement of each player can be responded to in a timely manner, avoiding the situation that all players are affected due to a poor network of one player, and ensuring the smoothness of the game experience.

The present application further provides an online somatosensory dance competition system, including:

a mobile client for sending a start game request of a player, and obtaining a movement signal generated when the player holds the mobile client, where the mobile client may be a smartphone, and the movement signal may be a speed signal, an acceleration signal, a direction signal, etc. received by a sensor in the mobile client;

an online somatosensory dance competition apparatus, connected to the mobile client, for receiving the start game request sent by the mobile client, and playing a dance competition game for the player using the online somatosensory dance competition method described above; and a screen projecting device, connected to the mobile client and the online somatosensory dance competition apparatus, for receiving and displaying a game screen of the mobile client, where the screen projecting device may be a projector or a television or the like.

Figure 11:
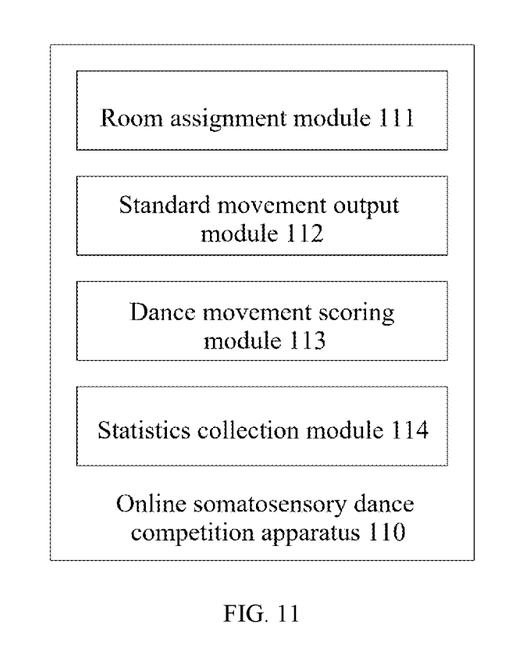
FIG. 11 is a schematic diagram of program modules of Embodiment 1 of an online somatosensory dance competition apparatus according to the present application.

Referring further to FIG. 11, which shows an online somatosensory dance competition apparatus, in this embodiment, the online somatosensory dance competition apparatus 110 may include or be divided into one or more program modules, and the one or more program modules are stored in a storage medium and executed by one or more processors to implement the present application and the foregoing online somatosensory dance competition method. The program modules mentioned in the present application refer to a series of computer-readable instruction segments that can complete specific functions, and are more suitable than the program to describe an execution process of the online somatosensory dance competition apparatus 110 in the storage medium. Functions of the program modules in this embodiment are described in detail in the following description.

a room assignment module 111 adapted to assign a room to one or more players in response to a start game request sent by the player, where all players in the same room share the same dance video;

a standard movement output module 112 adapted to output a plurality of standard movement images corresponding to the dance video in chronological order, where the standard movement image is used to represent position coordinates of different skeleton nodes at a corresponding moment;

a dance movement scoring module 113 adapted to receive a dance movement signal sent by each of the players, and give the player a score based on a similarity between the dance movement signal and a standard movement parameter, where the standard movement parameter corresponds to the standard movement image, and is used to represent acceleration information, speed information, and direction information of a preset skeleton node in the standard movement image; and a statistics collection module 114 adapted to collect statistics on an overall score and ranking of each of the players.

Figure 12:
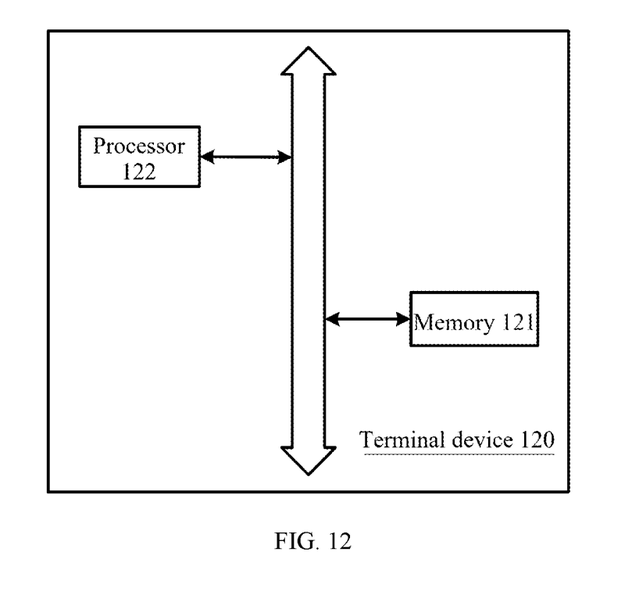
FIG. 12 is a schematic diagram of a hardware structure of Embodiment 1 of an online somatosensory dance competition apparatus according to the present application.

This embodiment further provides a computer device, such as a smartphone, a tablet computer, a notebook computer, a desktop computer, a rack server, a blade server, a tower server, or a cabinet server (including a standalone server or a server cluster consisting of a plurality of servers) that can execute a program. The computer device 120 in this embodiment at least includes but is not limited to: a memory 121 and a processor 122 that can be communicatively connected to each other by using a system bus, as shown in FIG. 12. It should be noted that FIG. 12 shows only the computer device 120 having components 121 to 122, but it should be understood that not all of the illustrated components are required to be implemented, and more or fewer components may be implemented instead.

In this embodiment, the memory 121 (namely, a readable storage medium) includes a flash memory, a hard disk, a multimedia card, a card-type memory (e.g., an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 121 may be an internal storage unit of the computer device 120, for example, a hard disk or a memory of the computer device 120. In some other embodiments, the memory 121 may alternatively be an external storage device of the computer device 120, for example, a plug-in hard disk provided on the computer device 120, a smart media card (SMC), a secure digital (SD) card, or a flash card. Certainly, the memory 121 may alternatively include both an internal storage unit of the computer device 120 and an external storage device thereof. In this embodiment, the memory 121 is generally configured to store an operating system and various types of application software installed on the computer device 120, such as the program code for the online somatosensory dance competition apparatus 110 in Embodiment 1. In addition, the memory 121 may be further configured to temporarily store various types of data that have been output or are to be output.

The processor 122 may be, in some embodiments, a central processing unit (CPU), a controller, a microcontroller, a microprocessor, or other data processing chips. The processor 122 is generally configured to control overall operations of the computer device 120. In this embodiment, the processor 122 is configured to run program code or processing data stored in the memory 121, for example, to run the online somatosensory dance competition apparatus 110 to implement the online somatosensory dance competition method in Embodiment 1.

This embodiment further provides a computer-readable storage medium, such as a flash memory, a hard disk, a multimedia card, a card-type memory (e.g., an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, a server, or an App store. The computer-readable storage medium stores computer-readable instructions, and when the program is executed by a processor, corresponding functions are performed. The computer-readable storage medium in this embodiment is configured to store the online somatosensory dance competition apparatus 10, where when the online somatosensory dance competition apparatus is executed by a processor, the following steps are implemented:

assigning a room to one or more players in response to a start game request sent by the player, wherein all players in the same room share the same dance video;

outputting a plurality of standard movement images corresponding to the dance video in chronological order, wherein the standard movement image is used to represent position coordinates of different skeleton nodes at a corresponding moment;

receiving a dance movement signal sent by each of the players, and giving the player a score based on a similarity between the dance movement signal and a standard movement parameter, wherein the standard movement parameter corresponds to the standard movement image; and collecting and outputting statistics on an overall score and ranking of each of the players.

The serial numbers of the foregoing embodiments of the present application are merely for description, and do not represent the superiority or inferiority of the embodiments.

Any process or method described in the flowcharts or otherwise described herein may be understood as including one or more modules, segments, or sections of code of executable instructions for implementing specific logical functions or steps; and the scope of the preferred implementations of the present application includes alternative implementations in which the functions may be performed out of the order shown or discussed, including performing the functions substantially concurrently or in the reverse order depending on the functions involved, which should be understood by those skilled in the art to which the embodiments of the present application pertain.

Those of ordinary skill in the art can understand that all or some of the steps carried in the method of the foregoing embodiment may be completed by a program instructing related hardware. The program may be stored in a computer-readable medium. The program, when executed, may include one of or a combination of the steps of the method embodiment.

In the description of this specification, the description with reference to the terms such as "an embodiment", "some embodiments", "an example", "a specific example", or "some examples" means that specific features, structures, materials, or characteristics described in combination with the embodiments or examples are included in at least one embodiment or example of the present application. In this specification, the schematic expressions of the above terms do not necessarily refer to the same embodiments or examples. Furthermore, the specific features, structures, materials, or characteristics described may be combined in a suitable manner in any one or more embodiments or examples.

Through the description of the above implementations, those skilled in the art can clearly understand that the methods of the foregoing embodiments can be implemented by software and necessary general hardware platforms. Definitely, the methods of the foregoing embodiments can also be implemented by hardware. However, in many cases, the former implementation is preferred.

The foregoing descriptions are merely preferred embodiments of the present application, and are not intended to limit the patent scope of the present application. Any transformation of equivalent structures or equivalent processes that is made using the contents of the description and accompanying drawings of the present application, or any direct or indirect application thereof in other related technical fields shall equally fall within the patent protection scope of the present application.

What is claimed is:

1. A method of implementing online somatosensory dance competitions, comprising:

assigning a room to one or more players in response to receiving one or more requests of starting a game sent by the one or more players, wherein all players in a same room share a same dance video;

generating a plurality of standard movement images corresponding to the same dance video, wherein the plurality of standard movement images each indicate position coordinates of different skeleton nodes at a corresponding moment;

outputting the plurality of standard movement images corresponding to the same dance video in a chronological order;

receiving dance movement signals associated with each of the one or more players, and determining scores for each player based on a similarity between the dance movement signals and a plurality of standard movement parameters, wherein the plurality of standard movement parameters correspond to the plurality of standard movement images; and collecting and outputting statistics on an overall score and ranking of each of the one or more players.

2. The method according to claim 1, wherein the assigning a room to one or more players in response to receiving one or more requests of starting a game sent by the one or more players further comprises:

obtaining characteristic data corresponding to each player; and assigning players having the same or similar characteristic data to the same room.

3. The method according to claim 1, wherein the generating a plurality of standard movement images further comprises:

performing a conversion condition check on a dance video uploaded by a user to determine whether the dance video meets a predetermined condition;

generating, for the dance video that succeeds in the conversion condition check, a skeleton node image corresponding to each frame of the dance video based on a skeleton node model; and performing cluster analysis on all skeleton node images and identifying skeleton node images corresponding to a cluster center of each set of obtained clusters as the plurality of standard movement images.

4. The method according to claim 3, wherein the determining whether the dance video meets a predetermined condition further comprises:

determining whether a number of characters in the dance video is within a preset number range;

determining whether a character object constantly appears in the dance video; and determining whether an average size proportion of the character object in each frame of the dance video is within a preset proportion range.

5. The method according to claim 1, wherein the plurality of standard movement parameters each comprise standard acceleration information, standard speed information, and standard direction information, and wherein the plurality of standard movement parameters each are determined by:

obtaining a first standard movement image and a second standard movement image, wherein there is a predetermined frame number difference between the first standard movement image and the second standard movement image;

determining first position coordinates of a preset skeleton node in the first standard movement image and second position coordinates of the preset skeleton node in the second standard movement image; and determining standard acceleration information, standard speed information, and standard direction information of the preset skeleton node associated with the second standard movement image based on the first position coordinates, the second position coordinates, and the predetermined frame number difference.

6. The method according to claim 1, wherein the outputting a plurality of standard movement images corresponding to the same dance video in a chronological order further comprises:

obtaining a preset moving speed and a display moment of each of the plurality of standard movement images, and a time difference between displaying one of the plurality of standard movement images and displaying a previous frame of the standard movement images;

determining, based on the time difference and the preset moving speed, a position in which the one of the plurality of standard movement images appears in a waiting area of a game interface so that the one of the plurality of standard movement images enters an evaluation area of the game interface at the display moment, wherein the plurality of standard movement images are configured to move in the waiting area at the preset moving speed towards the evaluation area; and displaying the one of the plurality of standard movement images in the evaluation area at a corresponding display moment.

7. The method according to claim 1, wherein the receiving dance movement signals associated with each of the one or more players, and determining scores for each player based on a similarity between the dance movement signals and standard movement parameters further comprises:

receiving, at a moment corresponding to a current video frame, a dance movement signal sent by each player, wherein the dance movement signal comprises acceleration information, speed information, and direction information; and comparing the movement signal of each player with a pre-calculated standard movement parameter among the plurality of standard movement parameters corresponding to a standard movement image among the plurality of standard movement images that corresponds to the current video frame, and outputting a score to all players in the same room at a next moment corresponding to a next video frame based on a comparison result.

8. The method according to claim 1, further comprising:

receiving, at a moment corresponding to a current video frame, a signal configured to trigger an action to be executed; and outputting an execution result of the action to all players in the same room at a next moment corresponding to a next video frame.

9. The method according to claim 1, further comprising:

projecting output content onto a target device in response to a screen projecting request sent by a player among the one or more players.

10. A computing device, comprising a memory, a processor, and computer-readable instructions stored on the memory and executable on the processor, wherein when executing the computer-readable instructions, the processor implements operations comprising:

assigning a room to one or more players in response to receiving one or more requests of starting a game sent by the one or more players, wherein all players in a same room share a same dance video;

generating a plurality of standard movement images corresponding to the same dance video, wherein the plurality of standard movement images each indicate position coordinates of different skeleton nodes at a corresponding moment;

outputting the plurality of standard movement images corresponding to the same dance video in a chronological order;

receiving dance movement signals associated with each of the one or more players, and determining scores for each player based on a similarity between the dance movement signals and a plurality of standard movement parameters, wherein the plurality of standard movement parameters correspond to the plurality of standard movement images; and collecting and outputting statistics on an overall score and ranking of each of the one or more players.

11. The computing device according to claim 10, wherein the assigning a room to one or more players in response to receiving one or more requests of starting a game sent by the one or more players further comprises:

obtaining characteristic data corresponding to each player; and assigning players having the same or similar characteristic data to the same room.

12. The computing device according to claim 10, wherein the generating a plurality of standard movement images further comprises:

performing a conversion condition check on a dance video uploaded by a user to determine whether the dance video meets a predetermined condition;

generating, for the dance video that succeeds in the conversion condition check, a skeleton node image corresponding to each frame of the dance video based on a skeleton node model; and performing cluster analysis on all skeleton node images and identifying skeleton node images corresponding to a cluster center of each set of obtained clusters as the plurality of standard movement images.

13. The computing device according to claim 12, wherein the determining whether the dance video meets a predetermined condition further comprises:

determining whether a number of characters in the dance video is within a preset number range;

determining whether a character object constantly appears in the dance video; and determining whether an average size proportion of the character object in each frame of the dance video is within a preset proportion range.

14. The computing device according to claim 10, wherein the plurality of standard movement parameters each comprise standard acceleration information, standard speed information, and standard direction information, and wherein the plurality of standard movement parameters each are determined by:

obtaining a first standard movement image and a second standard movement image, wherein there is a predetermined frame number difference between the first standard movement image and the second standard movement image;

determining first position coordinates of a preset skeleton node in the first standard movement image and second position coordinates of the preset skeleton node in the second standard movement image; and determining standard acceleration information, standard speed information, and standard direction information of the preset skeleton node associated with the second standard movement image based on the first position coordinates, the second position coordinates, and the predetermined frame number difference.

15. The computing device according to claim 10, wherein the outputting a plurality of standard movement images corresponding to the same dance video in a chronological order further comprises:

obtaining a preset moving speed and a display moment of each of the plurality of standard movement images, and a time difference between displaying one of the plurality of standard movement images and displaying a previous frame of the standard movement images;

determining, based on the time difference and the preset moving speed, a position in which the one of the plurality of standard movement images appears in a waiting area of a game interface so that the one of the plurality of standard movement images enters an evaluation area of the game interface at the display moment, wherein the plurality of standard movement images are configured to move in the waiting area at the preset moving speed towards the evaluation area; and displaying the one of the plurality of standard movement images in the evaluation area at a corresponding display moment.

16. The computing device according to claim 10, wherein the receiving dance movement signals associated with each of the one or more players, and determining scores for each player based on a similarity between the dance movement signals and standard movement parameters further comprises:

receiving, at a moment corresponding to a current video frame, a dance movement signal sent by each player, wherein the dance movement signal comprises acceleration information, speed information, and direction information; and comparing the movement signal of each player with a pre-calculated standard movement parameter among the plurality of standard movement parameters corresponding to a standard movement image among the plurality of standard movement images that corresponds to the current video frame, and outputting a score to all players in the same room at a next moment corresponding to a next video frame based on a comparison result.

17. A non-transitory computer-readable storage medium having stored thereon computer-readable instructions, wherein when the computer-readable instructions are executed by a processor to cause the processor to implement operations comprising:

assigning a room to one or more players in response to receiving one or more requests of starting a game sent by the one or more players, wherein all players in a same room share a same dance video;

generating a plurality of standard movement images corresponding to the same dance video, wherein the plurality of standard movement images each indicate position coordinates of different skeleton nodes at a corresponding moment;

outputting the plurality of standard movement images corresponding to the same dance video in a chronological order;

receiving dance movement signals associated with each of the one or more players, and determining scores for each player based on a similarity between the dance movement signals and a plurality of standard movement parameters, wherein the plurality of standard movement parameters correspond to the plurality of standard movement images; and collecting and outputting statistics on an overall score and ranking of each of the one or more players.

18. The non-transitory computer-readable storage medium of claim 17, wherein the generating a plurality of standard movement images further comprises:
  performing a conversion condition check on a dance video uploaded by a user to determine whether the dance video meets a predetermined condition, wherein determining whether the dance video meets a predetermined condition further comprises:
    determining whether a number of characters in the dance video is within a preset number range,
    determining whether a character object constantly appears in the dance video, and
    determining whether an average size proportion of the character object in each frame of the dance video is within a preset proportion range;
  generating, for the dance video that succeeds in the conversion condition check, a skeleton node image corresponding to each frame of the dance video based on a skeleton node model; and
  performing cluster analysis on all skeleton node images and identifying skeleton node images corresponding to a cluster center of each set of obtained clusters as the plurality of standard movement images.

19. The non-transitory computer-readable storage medium of claim 17, wherein the plurality of standard movement parameters each comprise standard acceleration information, standard speed information, and standard direction information, and wherein the plurality of standard movement parameters each are determined by:
  obtaining a first standard movement image and a second standard movement image, wherein there is a predetermined frame number difference between the first standard movement image and the second standard movement image;
  determining first position coordinates of a preset skeleton node in the first standard movement image and second position coordinates of the preset skeleton node in the second standard movement image; and
  determining standard acceleration information, standard speed information, and standard direction information of the preset skeleton node associated with the second standard movement image based on the first position coordinates, the second position coordinates, and the predetermined frame number difference.

20. The non-transitory computer-readable storage medium of claim 17, wherein the outputting a plurality of standard movement images corresponding to the same dance video in a chronological order further comprises:
  obtaining a preset moving speed and a display moment of each of the plurality of standard movement images, and a time difference between displaying one of the plurality of standard movement images and displaying a previous frame of the standard movement images;
  determining, based on the time difference and the preset moving speed, a position in which the one of the plurality of standard movement images appears in a waiting area of a game interface so that the one of the plurality of standard movement images enters an evaluation area of the game interface at the display moment, wherein the plurality of standard movement images are configured to move in the waiting area at the preset moving speed towards the evaluation area; and
  displaying the one of the plurality of standard movement images in the evaluation area at a corresponding display moment.

* * * * *